United States Patent [19]

Hendrix

[11] 4,349,596
[45] Sep. 14, 1982

[54] LOOSE MATERIAL RETAINER STRIP

[76] Inventor: Randle L. Hendrix, Rte. 3, Box 193, Claremore, Okla. 74017

[21] Appl. No.: 154,909

[22] Filed: May 30, 1980

[51] Int. Cl.³ ............................................. E01C 11/22
[52] U.S. Cl. ......................................... 428/83; 47/33; 52/102; 404/7
[58] Field of Search ........................ 47/33; 404/7, 8, 2, 404/3, 6; 52/102, 732; 428/83

[56] References Cited

U.S. PATENT DOCUMENTS

| | | | |
|---|---|---|---|
| 1,373,827 | 4/1921 | Nelson et al. | 47/33 X |
| 2,713,751 | 7/1955 | Hendrixson | 47/33 |
| 3,281,988 | 11/1966 | Cohen | 47/33 |
| 3,310,814 | 3/1967 | Lipman | 52/102 X |
| 3,332,197 | 7/1967 | Hinkle | 52/732 X |
| 3,378,949 | 4/1968 | Dorris | 47/33 |
| 3,762,113 | 10/1973 | O'Mullan et al. | 404/7 X |
| 3,788,001 | 1/1974 | Balfanz, Jr. | 47/33 |
| 3,806,096 | 4/1974 | Eccleston et al. | 47/33 X |
| 3,841,022 | 10/1974 | Thodos | 52/732 X |
| 4,074,479 | 2/1978 | Krupka | 47/33 X |
| 4,272,575 | 6/1981 | Egigian | 428/83 |

Primary Examiner—Henry F. Epstein
Attorney, Agent, or Firm—Head, Johnson & Stevenson

[57] ABSTRACT

A material retainer strip for holding gravel in a roadway, lining a flower bed or garden plot and generally maintaining the integrity of two separate surface materials, comprising elongated, flexible resilient strips of material having a substantially C-shaped cross-section, the base lip thereof being wider than the top lip, the base lip being secured to a surface by stakes. Included are a plurality of splice joints of various shapes for connecting the ends of the strips either in alignment or to permit execution of an abrupt turn in direction.

10 Claims, 6 Drawing Figures

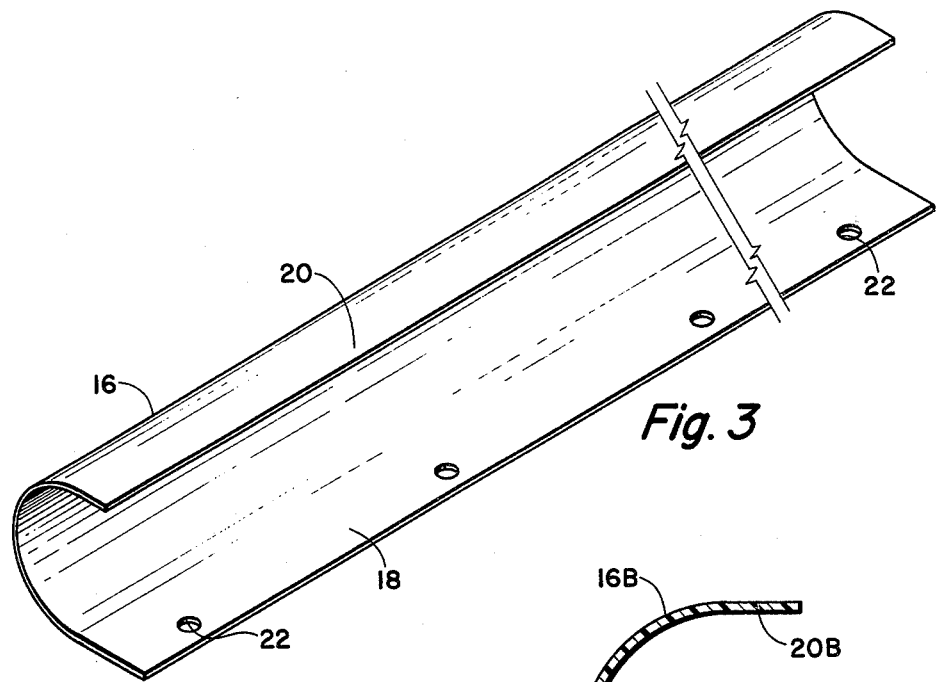
Fig. 3
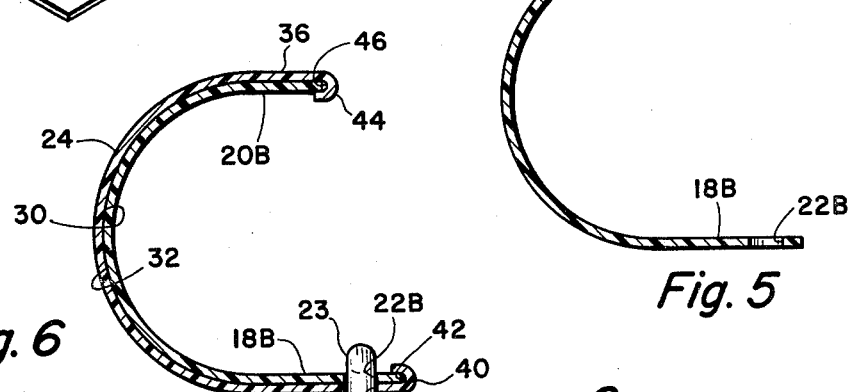
Fig. 5
Fig. 6
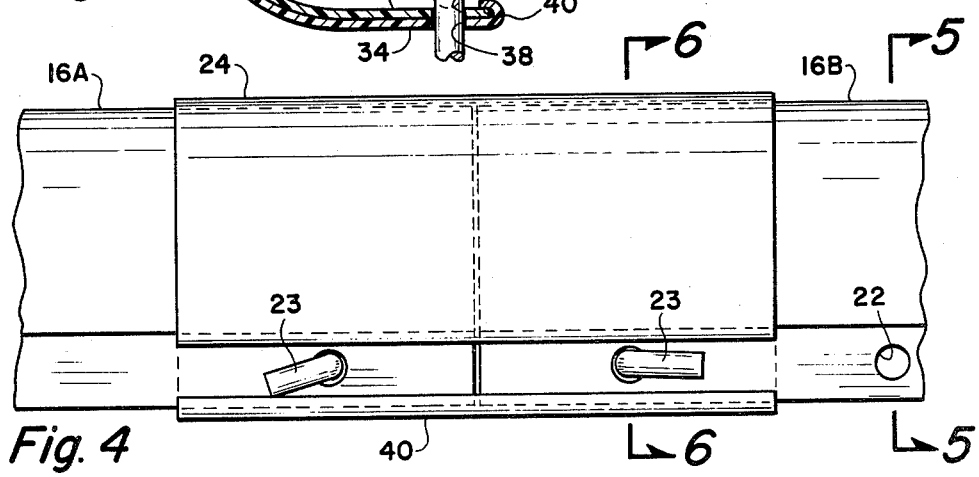
Fig. 4

LOOSE MATERIAL RETAINER STRIP

BACKGROUND OF THE INVENTION

1. Field of the Invention

The present invention relates to a loose material retainer and more particularly, but not by way of limitation, to a gravel retainer strip which is made up of elongated segments having C-shaped cross-sections and is flexible to conform to both vertical and horizontal contours and including various shaped splice joints for connecting the strips together.

2. History of the Prior Art

The use of gravel driveways is quite prevalent in both urban and rural dwellings when it is either too expensive or undesirable to lay concrete drives. However, inherent with the use of materials such as gravel, chat and the like, is the tendency of the material under use to spread onto the lawn or at least out of the driveway itself. This gravel, rock and the like, besides becoming unsightly, represents a hazard when mowing the lawn.

There have been many attempts at containing the gravel in the driveway area, such as by lining the driveway edges with railroad ties, decorative beams or the like, or even by lining with long steel strips the lower edge of which is embedded in the earth adjacent the driveway.

Unless the residence, or business for that matter, is constructed in a rustic motif, the use of railroad ties and beams often is unsightly and if struck by the wheel of the car can cause loss of control of the car or damage to the hubs.

On the other hand, the use of typical steel strips which are partially embedded in the ground presents a distinct safety hazard to children that might be playing in the area and can completely sever a vehicle tire if the person should accidently drive over the edge.

Further, neither of these devices keep the gravel from spilling over the top thereof when there are localized accumulations of gravel due to use of the roadway.

Another inherent problem in both business and residential construction is the ability to maintain the integrity of a flower bed or the like, to prevent gravel, mulch, bark and other flower bed type material from spilling over into the lawn. Most of the attempts at solving this problem, such as shown in the patent to Thodos, U.S. Pat. No. 3,841,022, issued Oct. 15, 1974 for a "Lawn Edging Device" requires that the lower portion thereof be buried in the earth in order to anchor the device. This greatly increases the difficulty in installing such a device and whenever there is an elongated vertical surface, it becomes difficult to follow contours that are in a vertical plane. This is also naturally a disadvantage of using the elongated metal strips which are partially buried in the earth in that, although the strips will bend to fit contours in a horizontal plane, they will not substantially bend in order to take care of vertical contours.

SUMMARY OF THE INVENTION

The present invention provides a loose material retainer strip which is particularly adaptable for retaining gravel in the driveway, lining flower beds and even the shoulders of asphalt or concrete highways. The device primarily consists of an elongated flexible, but resilient, strip of material which can easily be manufactured from plastic and which will bend to fit most gentle contours either in a horizontal or vertical plane.

The strips have a substantially C-shaped cross-section with the lower or base lip thereof being wider than the top lip, the base lip being provided with spaced apertures whereby it may be tacked to the ground by suitable stakes. The strip is installed with the concave portion thereof facing the loose material, such as gravel, in order to retain the gravel in place. After the gravel has been put in place, a substantial portion of the gravel actually rests on top of the bottom lip portion to further anchor the strips in place.

The device may be made from substantially any suitable color and since it will substantially fit the contours of the driveway, it is attractive in appearance over liners made from railroad ties, beams and the like. Further, due to the flexibility of the material, it does not provide a sharp edge or obstacles which represent a safety hazard for children and adults alike. Further, if a vehicle tire is driven across the strip, it simply is bent downwardly and then springs back into position after the wheel has cleared the strip thereby preventing any damage whatsoever to the vehicle tires.

Since the concave portion of the strip faces the loose material to be retained thereby, a localized build-up of gravel or the like will cause the strip to start to bend outwardly away from the gravel, which, in effect, raises the upper edge thereof to a higher elevation in order to better support the gravel until it can be re-distributed.

The invention further includes a variety of splicing joints which may be utilized to attach the strips together and are configured so that the splicing joints themselves are attached to the ground along with the strips.

The splicing joints also include various angled and right-angle configurations in order to take care of abrupt changes in direction at corners and the like.

DESCRIPTION OF THE DRAWINGS

Other and further advantageous features of the present invention will hereinafter more fully appear in connection with a detailed description of the drawings in which:

FIG. 3 is a detailed perspective view of the strip material.

FIG. 4 is a top plan view of a splice joint embodying the present invention.

FIG. 5 is a sectional elevational view taken along the broken lines 5—5 of FIG. 4.

FIG. 6 is a sectional elevational view taken along the broken lines 6—6 of FIG. 4.

DESCRIPTION OF THE PREFERRED EMBODIMENT

Figure 1:
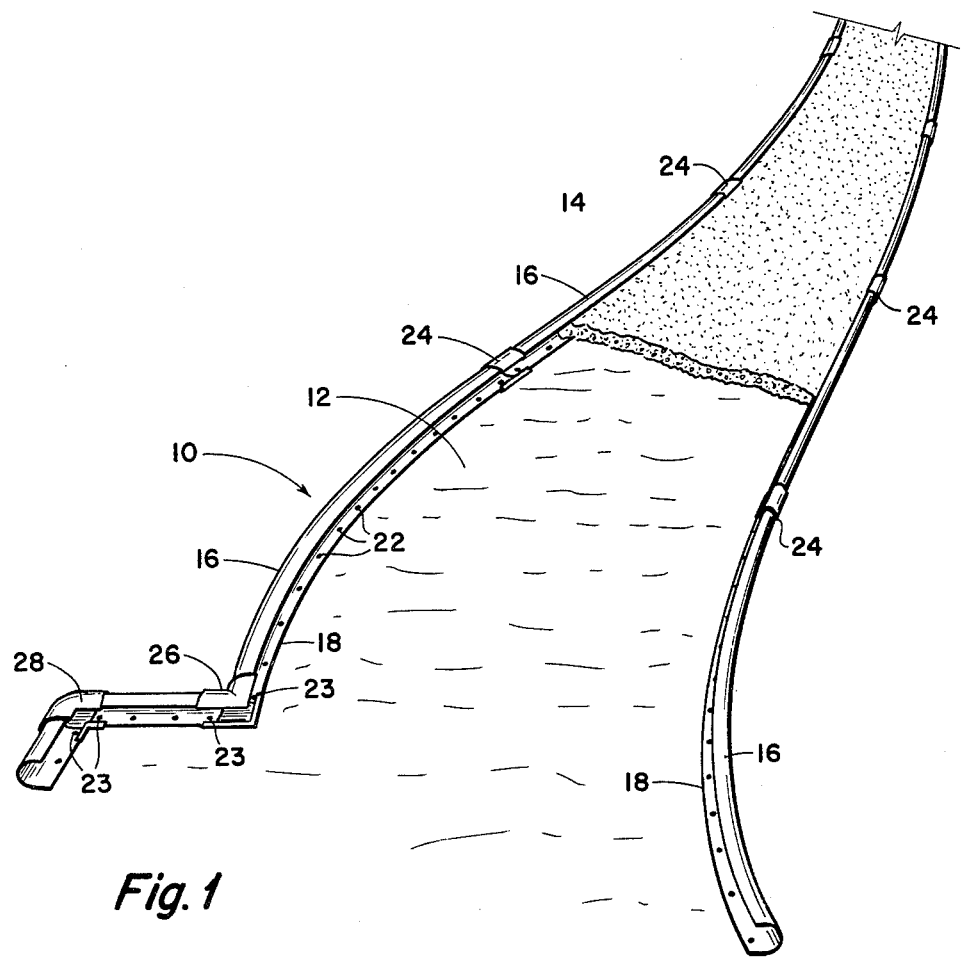
FIG. 1 is a perspective view of a driveway comprising a strip of liner embodying the present invention.

Referring to the drawings in detail, reference character 10 generally indicates a retainer strip assembly which is utilized to line a roadway 12 having a layer of gravel or other aggregate material 14 therein.

It is noted at the outset, that this device may be utilized to line a flower bed to retain whatever loose material might make up the flower bed composition. It can also be used to line the shoulder surfaces of an asphalt or concrete highway and for generally any purpose wherein it is desirable to separate or retain loose material.

Figure 2:
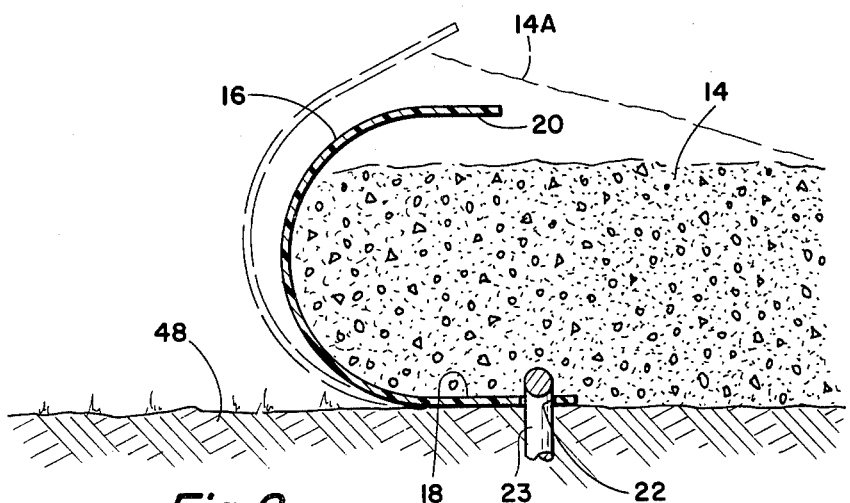
FIG. 2 is an end elevational sectional view of the strip of FIG. 1.

The retainer assembly 10 generally comprises a plurality of elongated strips 16 which have a substantially C-shaped elevational cross-section as is clear in FIG. 2, the base lip 18 thereof extending outwardly or being wider than the top lip portion 20. The base lip portion 18 is provided with a plurality of spaced bores 22, said bores typically being positioned in that portion of the base lip 18 which extends out beyond vertical alignment with the edge of the top lip 20. By positioning the bore as such, a suitable rod or stake 23 may be driven through the aperture 22 into the earth without substantial interference from the top lip 20.

The retainer assembly 10 further comprises a plurality of straight splice joints 24 which are utilized to connect the elongated strip segments 16 together in end-to-end relationship as shown in FIG. 1.

The material making up the strip segments 16 may be of a plastic wherein the plastic is resilient but is flexible within a certain degree of freedom so that the strip can conform to the contour of the roadway 12 both horizontally and vertically with minimal deformation from its C-shape cross-section. However, when it is desirable to make an abrupt turn such as a right-angle turn, suitable splice joints 26 and 28 may be utilized again as shown in FIG. 1. These joints 26 and 28 could also be constructed to bend in a vertical plane as opposed to a horizontal plane as shown.

Referring now to FIGS. 4, 5 and 6, the splice joint 24 is shown connecting two adjacent ends of retainer strip segments 16A and 16B. The splice segment 24 has a C-shape cross-section similar to that of the strip segment 16B but of a slightly larger configuration so that the inside surface 30 thereof conforms to the outside surface 32 of the strip segment 16. The splice member has a base lip portion 34 which is wider than the top lip portion thereof 36. The base lip portion 34 comprises a vertical aperture 38 therein which is alignable with the aperture 22 of the segment so that the stake or rod 23 may be passed through the aligned apertures for securing the splice joint and the strip segment to the earth.

The outer edge of the base lip 34 of the splice segment 24 is provided with an inwardly directed curled lip portion 40 which forms an elongated groove 42 therealong for slidably receiving and holding the end of the strip segment 16. Likewise, the top lip 36 of the splice joint is provided with a similar curled in lip portion 44 thereby forming a groove 46 for slidably receiving and retaining the upper edge of the strip segment 16.

Referring back to FIG. 2 of the drawings, it can be seen that the strip 16 may be laid along the desired road bed with its base lip 18 in contact with the surface of the earth indicated by reference character 48. The stake 23 which may be constructed of reinforcement bar stock or may be specially made stakes, can then be driven through the aperture 22 well within the earth 48 for securing the strip in place.

The gravel or aggregate 14 may then be added to the desired level wherein it will be efficiently retained by the strip segment 16. If the gravel should become displaced through use or traffic, a build-up of gravel may occur at some localized area along the strip 16 as shown by the dashed lines 14A thereby tending to force the strip away from the gravel bed.

However, due to the resiliency of the strip, the C-shaped cross-section of the strip will simply be forced backwardly thereby raising the outer edge or lip portion 20 upwardly which tends to still retain the gravel until it can be re-distributed. Further, it can be seen that the strip member being of a flexible plastic material may be run over by vehicle tires without substantial damage to the tires and likewise, in its normal configuration, would not present a hazard to people working with or around the strips.

Also, when using the splice joints, such as 26 and 28, the strip segment 16 could be cut at an angle to more nearly conform to the internal shape of the segments 26 and 28 or they may be simply cut off straight and inserted as shown with the stakes 23 driven through both the strip member and the splice segments 26 and 28.

From the foregoing it is apparent that the present invention provides a retainer strip which is simple and efficient in construction and aesthetically satisfactory. It is further apparent that the present invention provides a retainer which is safe in its use from both personal injury and property damage.

Whereas the present invention has been described in particular relation to the drawings attached hereto, other and further modifications may be made within the spirit and scope of the invention.

What is claimed is:

1. A loose material retainer strip comprising an elongated flexible strip having a substantially C-shaped cross-section, a base lip thereof being wider than a top lip thereof, a plurality of longitudinally spaced apertures in the base lip for securing the strip in place with appropriate stakes, the material of said strip being flexible and resilient to substantially retain its C-shaped cross-section, whereby upon installation the base lip is secured to the ground with stakes with the open side of the C-shaped strip facing the loose material to be retained, the loose material being filled or pulled over said base lip.

2. A retainer strip as set forth in claim 1 wherein the spaced apertures are positioned near the outer edge of the base lip such that the center line axis of said apertures do not intersect the top lip.

3. A loose material retainer strip comprising an elongated flexible strip having a substantially C-shaped cross-section, a base lip thereof being wider than a top lip thereof, a plurality of longitudinally spaced apertures in the base lip for securing the strip in place with appropriate stakes, the material of said strip being flexible and resilient to substantially retain its C-shaped cross-section, and including splicing means for connecting the ends of adjacent retainer strips together, said splicing means comprising an elongated sleeve segment having a C-shaped cross-section similar to that of the retainer strip and including longitudinal grooves along the outer edge of said sleeve segment for telescopingly receiving adjacent ends of said retainer strips therein.

4. A retainer strip as set forth in claim 3 wherein the elongated strips include apertures in the base lip thereof adjacent each end thereof and the splice means include a pair of spaced apertures in a base lip thereof alignable with the said strip apertures whereby said splice member and associated strip members may be anchored by a pair of stakes.

5. A retainer strip as set forth in claim 4 wherein the splice segment is a straight segment.

6. A retainer strip as set forth in claim 4 wherein the ends of the splice segment are formed at an angle to form an elbow joint.

7. A retainer strip as set forth in claim 6 wherein the joint is 90°.

8. A retainer strip as set forth in claim 6 wherein the joint is bent in the concave direction of the strip.

9. A retainer strip as set forth in claim 6 wherein the joint is bent in a convex direction of the strip.

10. A retainer strip as set forth in claim 1 and including stakes made of steel reinforcement bar segments.

* * * * *